Patented Dec. 16, 1924.

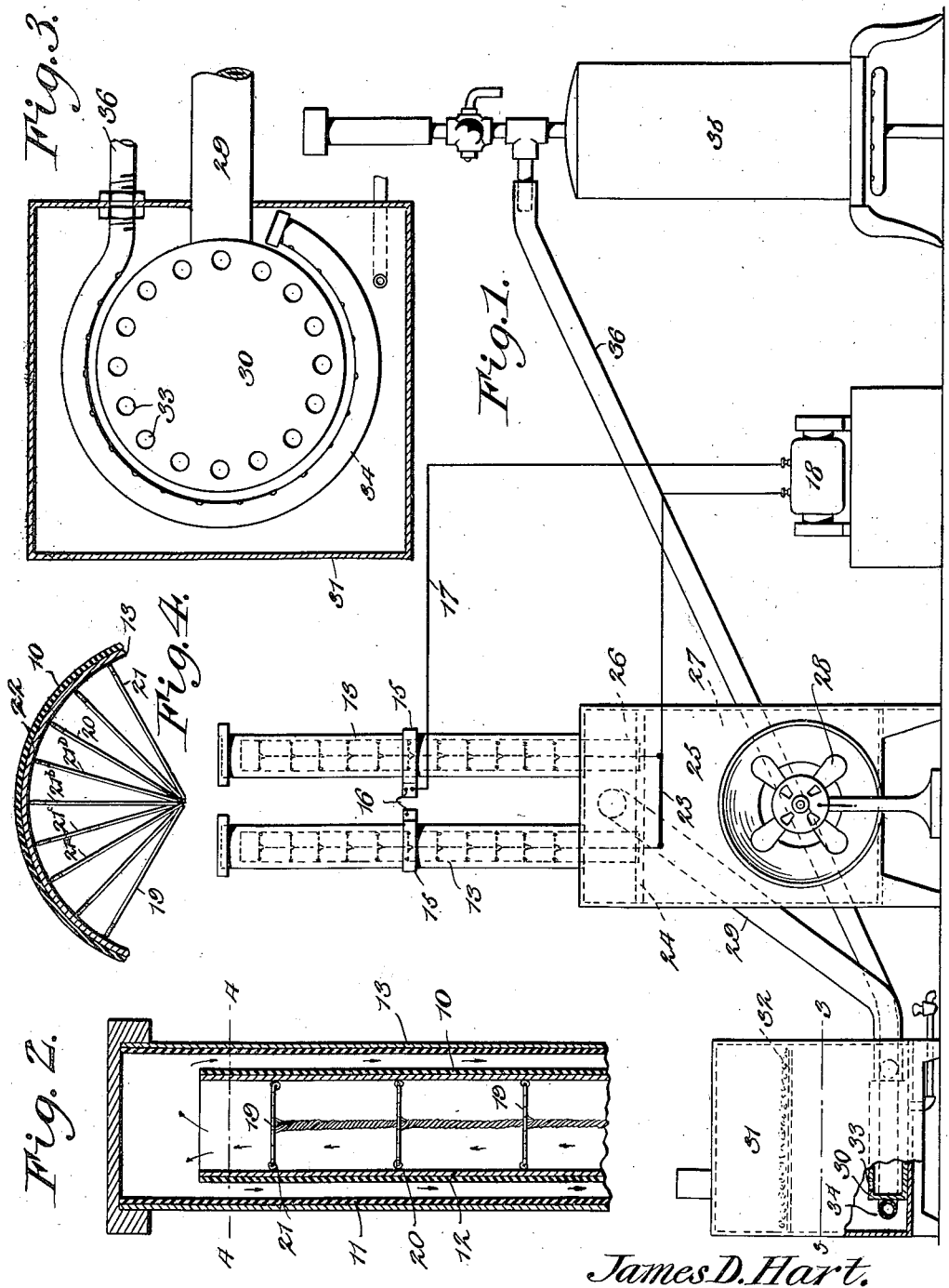

1,519,373

UNITED STATES PATENT OFFICE.

JAMES D. HART, OF WEST NEW BRIGHTON, NEW YORK, ASSIGNOR OF FORTY-FIVE PER CENT TO PATRICK F. QUINN, OF NEW YORK, N. Y.

COMMERCIAL OZONIZER.

Application filed April 4, 1922. Serial No. 549,621.

*To all whom it may concern:*

Be it known that I, JAMES D. HART, a citizen of the United States, residing at West New Brighton, S. I., in the county of Richmond and State of New York, have invented new and useful Improvements in Commercial Ozonizers, of which the following is a specification.

This invention relates to improvements in commercial ozonizers and their application to the treatment of vegetable matter, and particularly the treatment of low grade coffee; and one of the objects of the device is to utilize an ozonizer for impregnating low grade coffee so as to remove the earthy taste usual in such coffee.

Another object is to provide a new form of electrode whereby the charge may be more evenly conducted to the various portions of the foil lining of the inner tube of the ozonizer so as to prevent disruptive discharges whereby the device is quickly burned out, and to insure the so-called cold or silent discharge so necessary in an apparatus of this nature.

With these other objects in view, the invention resides in certain novel construction and combination and arrangement of parts, the essential features of which are hereinafter fully described, are particularly pointed out in the appended claims, and are illustrated in the accompanying drawing, in which:—

Figure 1 is a side elevation of the apparatus for use in my improved method of treating coffee.

Figure 2 is a fragmentary vertical sectional view of my improved ozonizer used in this process.

Figure 3 is an enlarged horizontal section on line 3—3 of Figure 1.

Figure 4 is an enlarged fragmentary sectional view on line 4—4 of Figure 2.

Like characters of reference refer to like parts in all views.

This invention is shown as embodying a method of treating low grade coffee, but it is understood that various forms of vegetable matter may be treated in this manner. Most low grade coffee is grown in the low lands and in consequence takes up a large amount of the loose soil which is not properly changed into vegetable matter. When this coffee is boiled it has a heavy sediment and the taste is decidedly earthy. By subjecting this low grade coffee to the action of ozone, the earthy taste is eliminated.

Referring to the drawing in detail, 10 and 11 represent inner and outer tubes of insulating material, the inner one 10 of which is provided with a lining 12 of foil, while the outer 11 is provided with an exterior coating 13 of foil. The upper end of tube 11 is closed by a suitable cap 14. A collar 15 of suitable contact material is secured outside of the foil 13 and where more than one set of tubes is used, the collars are connected to each other as at 16 and are connected by a wire 17 with one terminal of a high tension static transformer conventionally shown at 18. The devices thus far described are similar to those already in use on ozonizers.

The electrodes embody a new principle, and are constructed particularly with the idea of contacting the foil lining 12 at substantially equi-spaced points so as to effect a more uniform discharge. Each electrode comprises a sheaf of wires 19, which extend out radially as at 20 forming a plurality of equi-spaced sets of fingers 21. The end of each finger is bent at 22 so as to form a curvi-linear contact portion to touch the lining 12. Not only are the sets of fingers equally spaced vertically; but also the fingers of each set are spaced apart equally. Thus if there are twelve fingers 21 in a set, each is spaced 30° from the next one on each side. Also the fingers of one set are arranged between the fingers of the adjacent set when looking down. This is illustrated in Figure 4 where 21$^a$ and 21$^b$ are two fingers of an upper set and 21$^c$ and 21$^d$ are fingers of a lower set. Thus if the radial distance from 21$^a$ to 21$^b$ is 30° then the radial distance from 21$^c$ to either 21$^a$ or 21$^b$ is 15°.

By constructing the electrode in the form described, the fingers may be flexed in the length of the tube and will maintain their equi-spaced relation whereas in the elliptical form of contact finger, the fingers are apt to bunch or lose their equi-spaced relation whereby the charge is not equally distributed to the lining resulting at times in an objectionable disruptive discharge, and adways tending to rapidly use up or burn out the apparatus.

In the apparatus shown the electrodes are connected to each other by a wire 23 the other end of which is connected to the transformer. The inner tubes 10 extend downwardly below the bottoms of tubes 11 and cover openings in a partition 24 in a blower chest 25. The partition 24 thus divides the chest into upper and lower portions 26 and 27, tubes 10 communicating with portion 27 and tubes 11 with portion 26. A blower or fan is shown at 28 and may be operated by any desired means to drive air up in tubes 10. By reference to the drawing, it will be seen that tubes 10 do not extend all the way up in tubes 11, and the air which is forced up inside of tubes 10 will then pass down between tubes 10 and 11 and into chamber 26 from which it is conducted by a pipe 29 into a drum 30. Drum 30 is located inside an oven 31 having a grate or screen at 32 on which the coffee is placed. Drum 30 is provided with a number of apertures 33 from which the ozonized air is directed upwardly against the coffee.

In order to open the pores of the coffee a steam coil 34 surrounds drums 30 and has a plurality of apertures from which the steam may be directed upwardly against the coffee. The steam is generated in a boiler 35 and conducted to the coil 34 by a pipe 36. The steam therefore opens the pores of the coffee and the ozone then impregnates it, with the result as aforesaid that the earthy taste is removed.

Another use or application is in the seasoning of lumber. In this case, the oven is constructed of a suitable size and shape to receive the lumber to be seasoned, and the lumber is subjected to the action of steam and the ozonized air as above pointed out with regard to the treatment of coffee. The process has been found to season the lumber in a manner superior to kiln seasoning.

From the above description, it will be seen that the application of the invention is not limited to coffee but may be applied to lumber and various other vegetable products. I do not, therefore, wish to be considered as limiting myself to the exact details of the herein described process and mechanism, nor to anything less than the whole of my invention as defined in the following claims.

What is claimed as new is:—

1. An electrode comprising a sheaf of wires twisted together and having their ends bent radially in a plurality of sets of fingers, each finger having its end formed with a curvi-linear contact.

2. An electrode comprising a sheaf of wires twisted together and having their ends bent radially in a plurality of equally spaced sets of fingers, the fingers of each set being equally spaced circumferentially having their ends formed into curvi-linear contacts.

3. An electrode comprising a sheaf of wires twisted together and having their ends bent radially in a plurality of fingers, each of said fingers having its end formed into a curvilinear contact.

In testimony whereof I have affixed my signature.

JAMES D. HART.